INVENTOR
James G.E. Farnum
by Wolfe, Hubbard, Voit & Osann
ATTORNEY

INVENTOR
James G.E. Farnum
by Wolfe, Hubbard, Voit & Osann
ATTORNEY

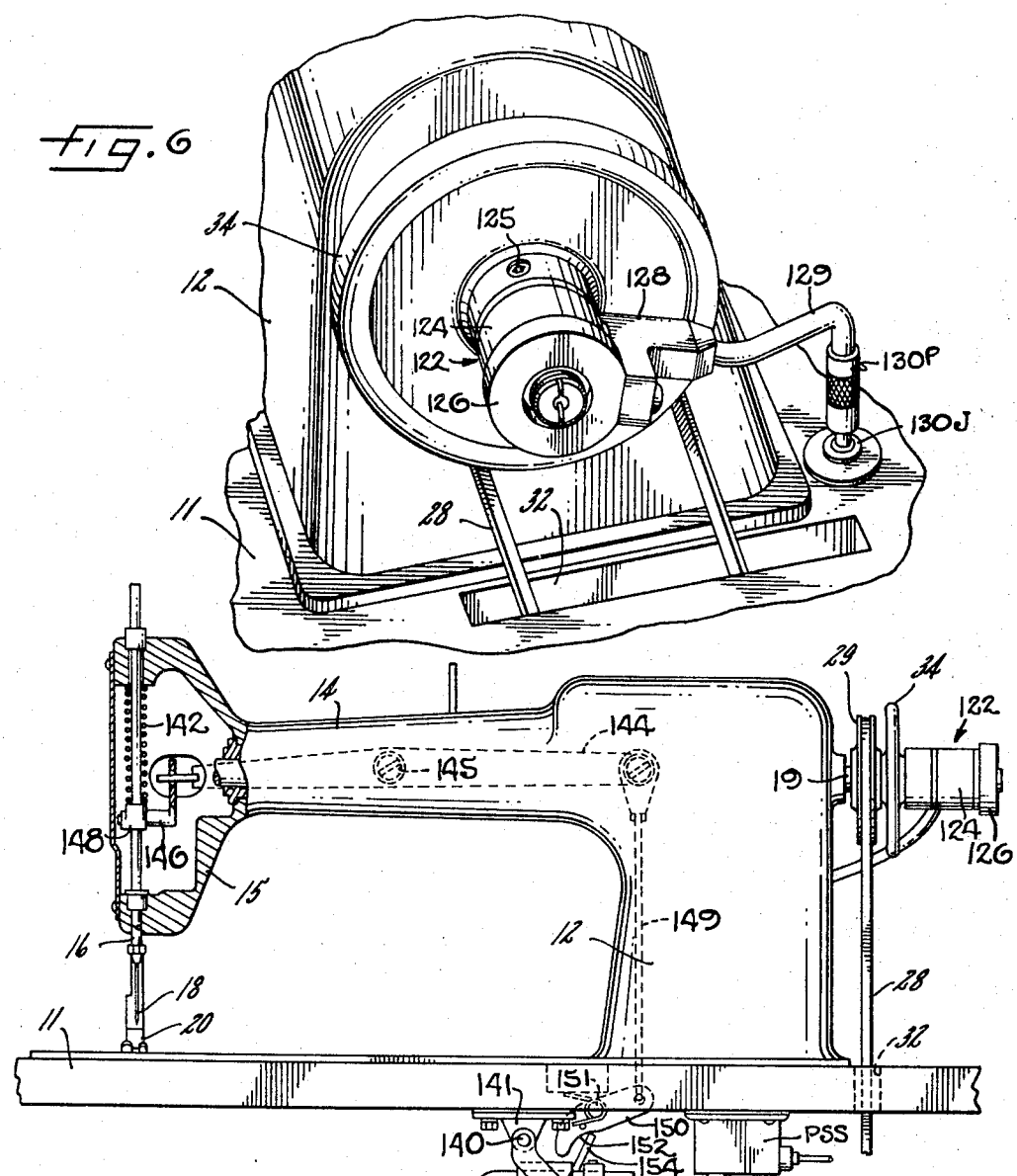

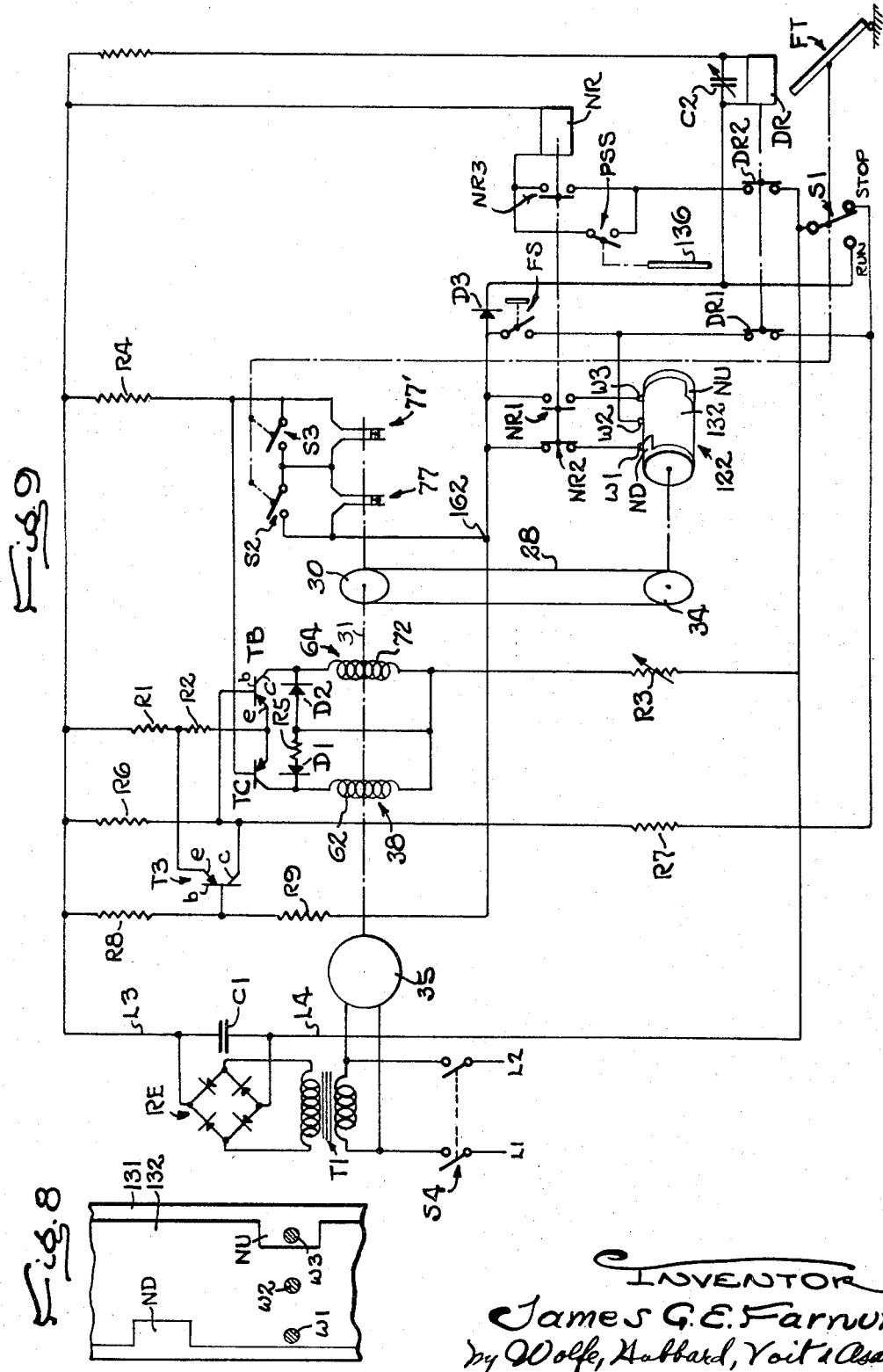

United States Patent Office 3,404,767
Patented Oct. 8, 1968

3,404,767
SPEED AND POSITIONING CONTROL APPARATUS FOR POWER DRIVEN MACHINES
James G. E. Farnum, Madison, Wis., assignor to Warner Electric Brake & Clutch Company, South Beloit, Ill., a corporation of Delaware
Filed Apr. 26, 1965, Ser. No. 450,888
11 Claims. (Cl. 192—18)

ABSTRACT OF THE DISCLOSURE

A system for driving a shaft (such as the input shaft for a sewing machine) from a constant speed power shaft (such as that of a continuously running motor) wherein an electromagnetic clutch is interposed between the two shafts and an electromagnetic brake is associated with the driven shaft. The clutch and brake are complementally energized to make the driven shaft selectively run or stop, but under running conditions the average speed of the driven shaft is held at a desired value by centrifugally operated switch contacts which open or close when the speed rises above or falls below a predetermined value and which act to turn the clutch off or on in cycles. When the system is placed in the stop condition, the brake is nevertheless deenergized and the clutch is energized until the member moves to a predetermined position as determined by a position sensing switch. Such energization of the clutch is also controlled by centrifugally-operated switch contacts which open or close when the speed of the driven shaft rises above or falls below a predetermined value so that the clutch is cycled on and off to keep the speed at a low average value until the position sensing switch opens to energize the brake and stop the shaft in a predetermined position without overrun. This system is disclosed in connection with the control of a sewing machine, but it has wide utility. The two predetermined values mentioned above may be different or may be the same, and either two separate centrifugal switches or one single centrifugal switch may serve for control of the running speed and the positioning speed. In any case, the clutch coil is either turned fully off or on by the action of the centrifugal switch, so that it receives its full excitation during the on periods and the torque applied to the driven shaft during positioning may be the maximum torque transmittable by the clutch.

---

The present invention relates generally to power driven machines and, more particularly, to speed and positioning control apparatus for such machines. In its principal aspects, the invention is concerned with an improved power control system which functions not only to control the speed of the driven components of the apparatus during operation thereof, but which also functions to automatically position the driven system components in a predetermined stop or "dead" position at the conclusion of an operating cycle.

In power driven machines, it is often necessary to position the driven elements of the machine each time the latter is stopped. Merely by way of example, where the machine comprises a sewing machine having a vertically reciprocating needle, the needle generally must be stopped in either the needle-down or needle-up position. The particular one of the stop positions to be selected will normally depend upon whether sewing is to be continued (for example, in a different direction) or whether the operator desires to remove the material from the machine.

Prior to the present invention, those skilled in the art have known that driven machine elements can be positioned when the machine is stopped, by randomly stopping the machine in any position and thereafter, stepping or slowly driving the element to the desired stop position. However, in driving the machine slowly, only low torque is applied and problems have heretofore been encountered in that sufficient driving torque is not supplied for proper operation of the driven element. For instance, where a sewing machine needle is the element being positioned, insufficient driving torque will result in failure of the needle to penetrate the material being sewed. However, when the torque applied is raised to a level sufficient to insure effective penetration of the material, the driving speed is also increased, and this has often resulted in the machine overrunning the desired stop position, thereby decreasing positioning accuracy.

A general aim of the present invention is to provide an improved control system which overcomes all of the foregoing disadvantages and which permits proper positioning of driven machine components at a high controlled speed and with sufficient torque to permit proper operation of the driven components. While not so limited in its application, the invention will find particularly advantageous use in conjunction with sewing machines where there is a need to properly position the needle on a repetitive basis in either or both a needle-down or a needle-up position.

More particularly stated, an object of the present invention is to provide an improved power control system which not only permits control of the operating speed or speeds of a power driven machine, but which also permits effective and reliable positioning of the driven machine components in a predetermined stop position at the conclusion of an operating cycle or portion thereof.

A further object of the invention is to provide an improved control system including means for operating a multi-speed power driven machine at closely regulated speeds, and which functions after the driven element has been randomly stopped, to index the driven element at closely regulated speeds for precise positioning of the driven element in a preselected stop position, or in a preselected one of several predetermined stop positions.

Other objects and advantages of the invention will become apparent as the following description proceeds, taken in conjunction with the accompanying drawings, in which FIGURE 1 is a perspective view of an exemplary machine, here an industrial-type sewing machine, embodying the features of the present invention;

FIG. 6 is an enlarged fragmentary perspective view illustrating details of the rotary switch utilized with the machine shown in FIG. 1 for continuously detecting the driven element position;

FIG. 7 is a fragmentary front elevational view on a slightly enlarged scale of a portion of the exemplary sewing machine shown in FIG. 1, here illustrating details of the needle position selector and presser foot linkage;

FIG. 8 is an enlarged expanded view of the commutator and brushes of the switch illustrated in FIG. 6; and FIG. 9 is a schematic wiring diagram illustrating the electrical components used in an exemplary control circuit for the embodiment of the invention shown in FIGS. 1 through 8.

Figure 1:
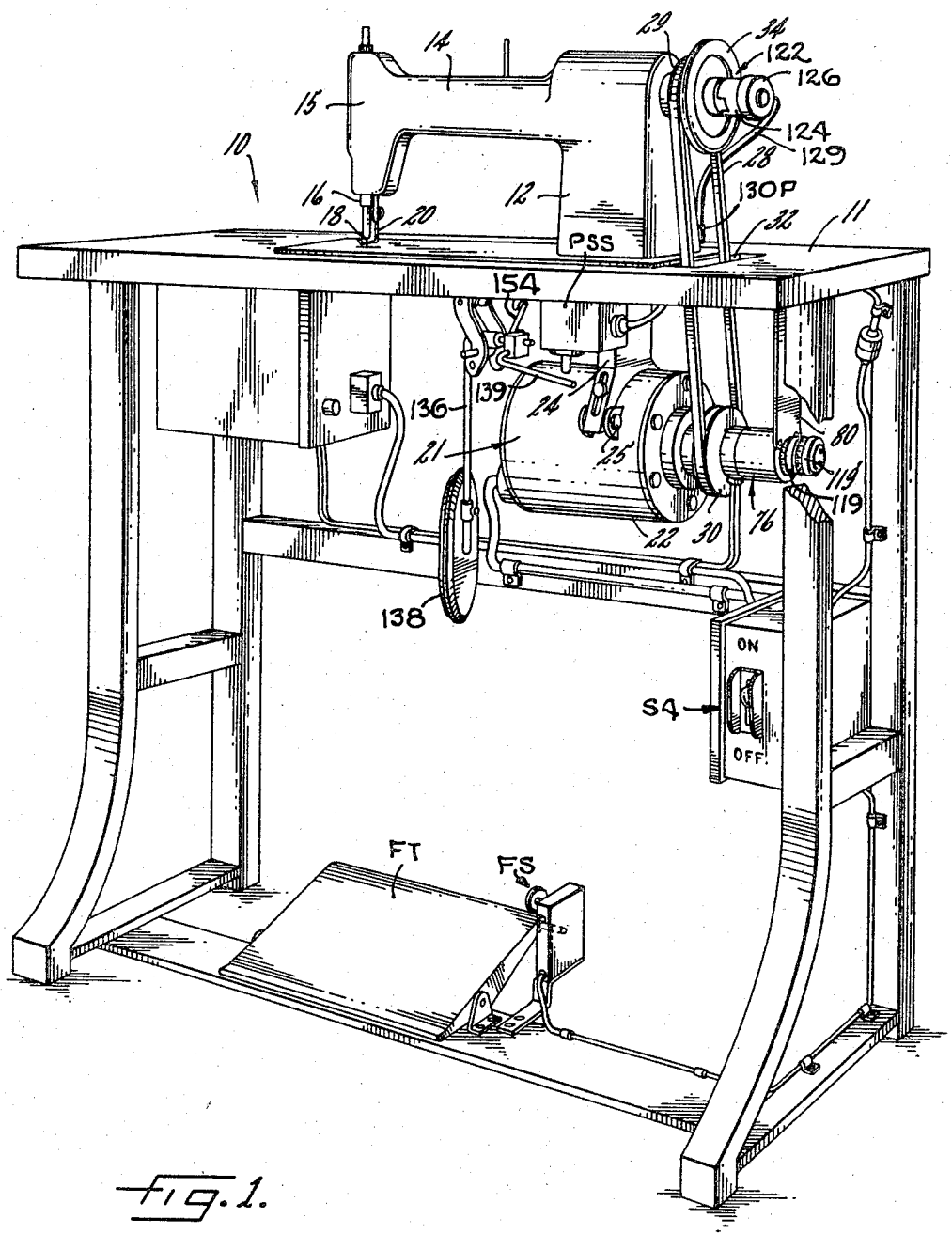

While the present invention is susceptible of various modifications and alternative forms, a specific embodiment thereof has been shown by way of example in the drawings and will herein be described in detail. It should be understood, however, that it is not intended to limit the invention to the particular form disclosed herein, but, on the contrary, the intention is to cover all modifications equivalents and alternatives falling within the spirit and scope of the invention as expressed on the appended claims.

THE ENVIRONMENT OF THE INVENTION

(a) General organization of exemplary sewing machine

Referring now to the drawings, there is illustrated in FIG. 1 an exemplary power driven sewing machine 10, representative of one of various types of machines in which the subject invention may be employed. The sewing machine 10 is mounted on a table 11 and includes an upright pedestal 12 rigidly secured to the table top, supporting a horizontal arm 14 substantially parallel with and spaced above the top of the table so as to overlie the material being sewed. The free end of the arm 14 terminates in a hollow head 15 which houses the upper end of a reciprocatory needle bar 16 supporting a vertically disposed sewing needle 18 adapted to be driven up and down to penetrate and sew the material supported on the table top. The needle bar 16 is coupled in a conventional manner (not shown) to one end of a horizontally disposed shaft 19 journaled for rotation in the arm 14 and the upper end of the pedestal 12, and projecting laterally from the pedestal (i.e., to the right as viewed in FIGS. 2 and 7). As is conventional in sewing machines of the type illustrated, a bifurcated presser foot 20 is supported for endwise vertical movement in the head 15 and normally biased into a position wherein the material being stitched is held flat on the table top.

Figure 2:
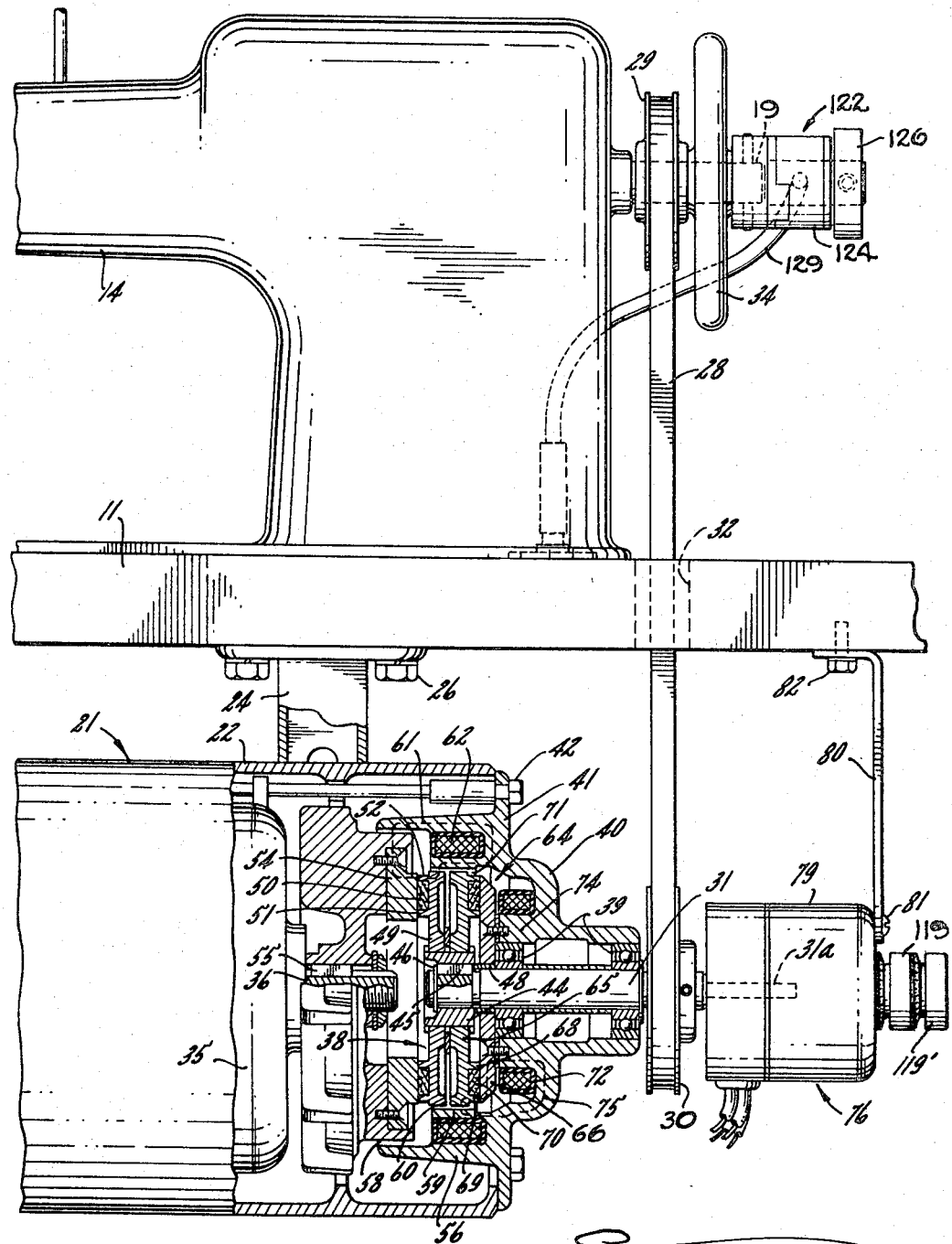
FIG. 2 is an enlarged fragmentary front elevation, in partial section, of the machine shown in FIG. 1 here illustrating details of the electromagnetic clutch and brake assemblies used with the exemplary machine.

For driving the needle bar 16 and the shaft 19 during operation of the sewing machine 10, a power transmitter 21 is rigidly fastened to the lower surface of the table 11 by securing a housing 22 thereof to a yoke-like bracket 24 by bolts 25. The bracket 24 is in turn secured directly to the bottom of the table 11 by bolts 26, as best shown in FIG. 2. To transmit power from the transmitter 21 to the shaft 19 of the sewing machine 10, a drive belt 28 is trained about drive pulleys 29 and 30 which are respectively fixed to the laterally projecting shaft 19 and an output shaft 31 of the transmitter 21, with the drive belt 28 passing through an opening 32 in the table 11. A handwheel or flywheel 34 is secured to the outboard end of the shaft 19 adjacent to the pulley 29 in a manner commonly employed with sewing machines of this type.

The power transmitter 21 includes a power drive means, a clutch for coupling and uncoupling the power drive means to the output shaft 31, and means to brake the output shaft to stop the driven element, which in this instance is the sewing machine needle mechanism. Referring to FIG. 2, the power transmitter 21 includes an electric motor 35 mounted within the tubular housing 22 and having an output shaft 36. This motor shaft 36 is selectively and disengageably connected to the output shaft 31 of the transmitter by an electromagnetic friction clutch 38. The shaft 31 is journaled in spaced antifriction bearings 39 carried by the hub 40 of an end cap 41 rigidly secured to the housing 22 by fasteners 42. A splined annular ring 44 is fastener for rotation with the inner end of shaft 31 (i.e., the left end in FIG. 2), by a key 45 and a snap ring 46, with annular spacer 48 disposed between the ring and the innermost bearing 39.

For completing the disengageable driving connection between the shaft 31 and the motor 35, the electromagnetic friction clutch 38 includes an internally splined disk 49 of magnetic material supported in driving engagement with, and axial movement on, the externally splined ring 44 on shaft 31. A pair of radially spaced annular flanges 51 and 52 on the inner face of the disk 49 support a ring 50 of friction material secured therebetween, and define a pair of annular poles flush with the ring surface. The inner face of the ring 50 and the poles 51 and 52 are in turn juxtaposed to the radial face of a flywheel 54 fastened by a key 55 to the motor shaft 36.

In the exemplary construction, the flywheel 54 projects into a cylindrical flange 56 integral with the end cap 41, with an annular radial gap 58 formed between the adjacent telescoped surfaces. A second cylindrical flange 59, integral with the end cap 41 and having a smaller diameter than the flange 56, projects towards, but terminates short of, the outer radial face of the flywheel 54. The flange 59 surrounds the outer peripheral face of the disk 49 defining therebetween a second radial gap 60. Thus, the end cap 41 with its flanges 56 and 59, the flywheel 54 and disk 49 with its poles 51 and 52 define a toroidal shaped flux circuit 61 including the radial air gaps 58 and 60. For creating a flux field threading through the circuit 61, a multiple turn annular clutch coil 62 is secured to the end cap 40 between the flanges 56 and 59. Thus, when the coil 62 is energized, the flux threading axially through the opposed clutch faces draws the disk 49 into driving engagement with the motor driven flywheel 54.

The power transmitter 21 also includes an electromagnetic friction brake 64 for slowing or stopping the shaft 31 when the clutch is disengaged. The brake includes an internally splined disk 65 of magnetic material supported for axial movement of the externally splined ring 44 outboard of the clutch disk 49 and adapted to be selectively drawn into intimate frictional braking engagement with a stationary plate 66 rigidly secured to the end cap 41. The brake disk 65 is formed similar to the clutch disk 49, with flanges 68 and 69 supporting a ring 70 of frictional material and defining radial pole faces flush with the outer face of the ring. A radial gap 71 is defined by the outer peripheral edge of disk 65 and the inner surface of the flange 59.

For energizing the brake, an annular multiple turn brake coil 72 is mounted between the tubular flange 59 and a smaller cylindrical flange 74 integral with the end cap. As shown in FIG. 2, the coil 72 is disposed to be energized and establish a flux field in a toroidal shaped flux circuit 75 defined by the end cap 41 with its flanges 59 and 74, brake plate 66, brake disk 65 with its pole faces 68 and 69, and the radial air gap 71. Thus, when the brake coil is energized, the disk 65 is drawn into gripping engagement with the stationary plate 66 for stopping rotation of the shaft 31.

(b) Speed control arrangement

To permit driving of the driven element by the relatively constant speed driving motor 35 at a selectable one of a plurality of speeds, means are provided for alternately engaging and disengaging the clutch 38 in response to detected actual speeds of the driven element. To accomplish this, regulating means are provided to adjust the speed of rotation of the drive shaft 31 by automatically breaking the energizing circuit for the clutch coil 62 whenever the speed of the sewing machine 10 exceeds a predetermined value, and by automatically reestablishing the clutch energizing circuit so as to reenergize the clutch coil 62 whenever the speed drops below that value. For this purpose a speed controller or governor 76 (FIGS. 3, 4 and 5) having a plurality of centrifugally operated bi-state devices or switch assemblies (there being one such device or assembly for each different operating speed below that of the electric motor) is provided for opening and closing the clutch energizing circuit. As will be hereinafter explained, two switches or bi-state devices 77 and 77' are utilized in the exemplary apparatus which open at different speeds such that by connecting either in the clutch control circuit, operation at either of two constant speeds is attained.

Figure 3:
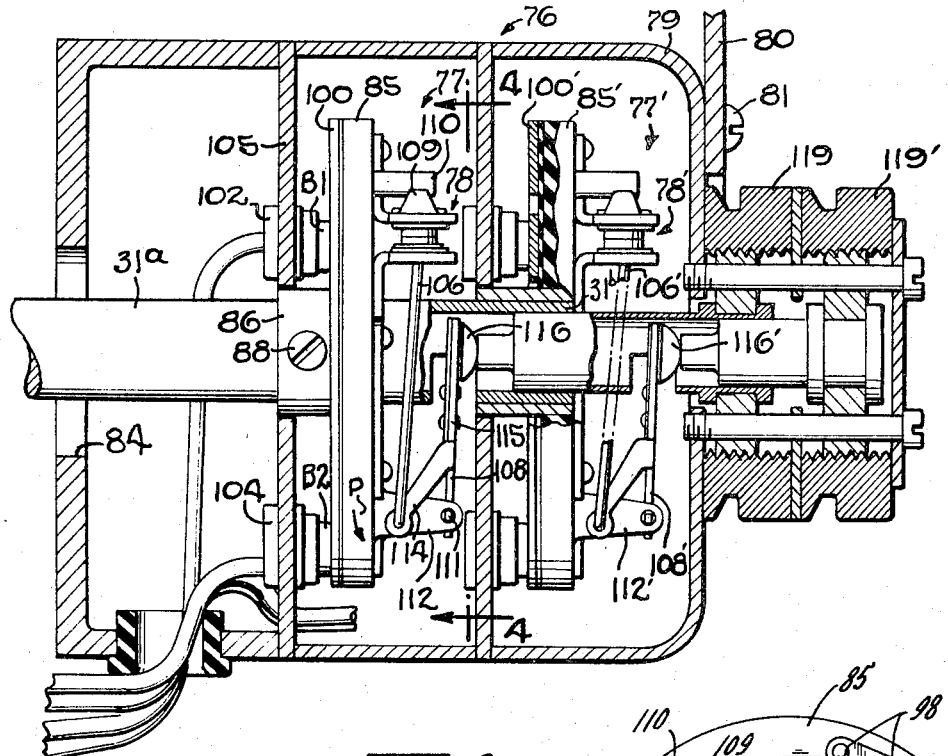
FIG. 3 is an enlarged sectional view of an exemplary centrifugal type speed controller used with the present invention.
Figure 4:
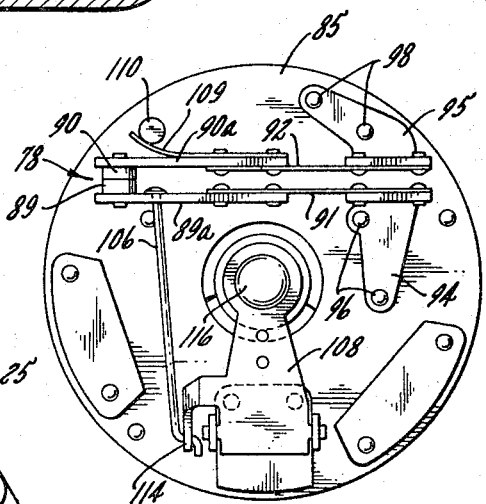
FIG. 4 is an end view taken along the line 4—4 of FIG. 3.
Figure 5:
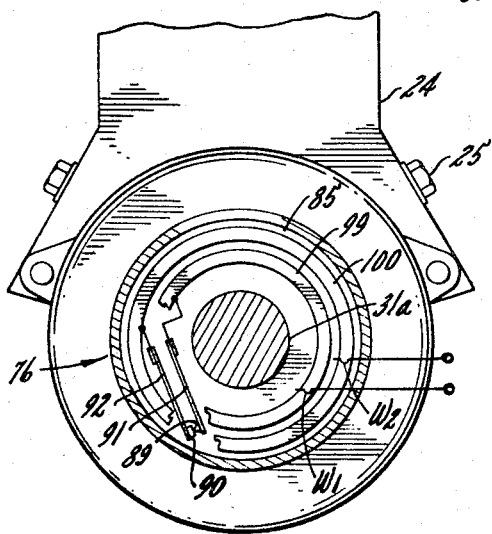
FIG. 5 is a schematic wiring diagram here utilized to simplify an understanding of the mode of operation of the exemplary centrifugal speed controller shown in FIGS. 3 and 4.

As shown in FIGS. 3 and 4, the speed controller 76 includes a housing 79 rigidly secured to a bracket 80 by a threaded fastener 81. While it will become apparent from the ensuing description that the speed controller 76 could be coupled to any of the driven machine components such, for example, as the handwheel 34 of the shaft 19, it is here shown as coupled directly to the clutch output shaft 31 of the power transmitter 21 (FIG. 2). The bracket 80 is secured to the lower surface of the table 11 by a screw 82 such that a shaft extension 31a integral with shaft 31 extends through an opening 84 (FIG. 3) formed in the housing 79.

The switch assembly 77 includes a disk 85 formed of a suitable nonconductive material and having an integral sleeve-like hub insert 86 rigidly secured by a set screw 88 for rotation with the projecting end of the shaft extension 31a. A centrifugally operated switch 78 is mounted on one face of the disk 85 and comprises a pair of contacts 89 and 90 which are normally engaged or closed when the rotational speed of the disk 85, and hence the speed of the driven element, is equal to or less than the predetermined operating speed. As best shown in FIG. 4, the contacts 89 and 90 are mounted on respective conductive contact arms 89a and 90a secured to conductive leaf springs 91 and 92. The latter are carried by brackets 94 and 95 which are respectively secured to the disk 85 by fasteners 96 and 98. The fasteners 96 and 98 pass completely through the disk 85 and are electrically connected to a pair of radially spaced, concentric annular rings 99 and 100 (FIG. 5) formed on the opposite face of the disk and positioned to be engaged by stationary brushes B1 and B2. Holders 102 and 104 mounted on a stationary housing plate 105 support the brushes.

The innermost contact 89 is held in a fixed position by an adjusting link 106 having one end secured to the contact arm 89a and its opposite end secured to an adjusting lever 108 mounted on the face of the disk 85. Thus, the link 106 prevents movement of the contact 89 due to centrifugal forces resulting from rotation of the disk 85. However, the outermost contact 90 is free to move outwardly, i.e., away from contact 89, a limited distance whenever the speed of the disk 85 reaches a value such that the resulting centrifugal forces are sufficient to overcome the biasing effect of spring arm 92 and a biasing spring 109, the latter having one end secured to the arm 90a and its opposite end abutting a stop lug 110 integral with the disk 85. The centrifugal switch is thus actuated to a first or conductive state when the rotating speed of the disk 85 is below a predetermined value, and actuated to a second or nonconductive state when the disk speed is above a predetermined value.

Means are also provided to permit adjustment of the speed of the driven element by adjustment of the speed at which the contacts 89 and 90 will separate. This is accomplished by varying the biasing effect of the springs 92 and 109, for example by shifting the contact 89 either inwardly or outwardly, thus varying the centrifugal force required to separate the contacts. To this end, the adjusting lever 108 is pivoted at 111 to a bracket 112 integral with the disk 85, the lever being provided with a tang 114 to which is secured the adjusting link 106. The lever further includes a radially extending arm 115 having an actuating button 116 formed on its inner end coaxial with the axis of rotation of the disk 85. A manually adjustable control knob 119 may be rotated to shift the button 116 in an axial direction, and pivot the lever 108 in a counterclockwise direction. The junction point between the link 106 and the tang 114 is thus moved along the path described by the arrow P in FIG. 3 to shift the interconnected link 106, contact arm 89a and contact 89 downwardly, or away from the stop lug 110. This movement of contact 89 decreases the biasing force created by springs 109 and 92 which tends to hold the contacts 89 and 90 closed, and thus reduces the centrifugal force required to open the contacts.

Where operation at more than one constant speed is desired a plurality of switches may be utilized, with each selectively inserted in the clutch energizing circuit and operating to maintain the speed of the shaft 31, and therefore of the driven element, at a different approximately constant speed. As illustrated in FIG. 3, a second identical centrifugal switch assembly 77' having a hub insert 86' is rigidly secured to the clutch shaft extension 31b. The specific details of this switch are identical to that of switch 77 and it may be set to open at different speed settings by adjustment of the control knob 119' to vary the position of a lever 106'.

(c) *Position sensing mechanism*

In keeping with the present invention, during at least that portion of the operating cycle when the operator wishes to stop the machine in a desired position (e.g. either the needle-up or needle-down position), provision is made for continuously detecting the position of the driven components of the machine and for creating control signals representative of whether such components are either in or out of such desired position. To this end, a bi-state position sensing means 122, illustrated in FIGS. 1, 6 and 7 as comprising a rotary switch mounted on the projecting end of the needle drive shaft 19 adjacent to the handwheel 34, provides a signal indicative of whether the driven element is out of or in a predetermined position. When the driven element is out of the desired position, the sensing means is in a first or conductive state. When the driven element is in the desired position the sensing means is in a second or nonconductive state.

This exemplary rotary switch 122 includes a tubular housing 124 (best illustrated in FIGS. 2, 6, and 8) rigidly secured for rotation with the projecting end of the shaft 19 by a set screw 125. The outer end of the housing 124 is journaled for rotation within a stationary collar 126 by suitable bearings (not shown), the collar here being integral with a stationary contact arm 128 carrying wiper contacts W1, W2 and W3. Rotation of the collar 126 and contact arm 128 is precluded by a cable 129 which carries the conductors for the wiper contacts and is detachably secured in a plug 130P disposed in the top of the table 11 by a jack 130J. The rotating switch housing 124 has formed on its outer surface a layer of insulating or barrier material 131 upon which is disposed an annular conductive segment or commutator 132 positioned for sliding contact with the stationary wipers carried by the contact arm 128.

As illustrated in FIGS. 2 and 8, the commutator 132 has cutout portions formed in its opposite edges which define a pair of exposed areas ND, NU of the insulating material 131. The exposed areas ND, NU are positioned to be engaged with the wipers W1, W3 respectively once during each revolution of the shaft 19, and hence once for each complete reciprocation of the needle bar 16 (FIG. 1). The wipers W1 and W3 are alined with the exposed areas ND, NU of non-conductive material disposed on diametrically opposite sides of the housing 124. These exposed areas are positioned such that when the wiper W1 engages the portion ND the needle is in the needle-down position. The exposed portion NU is 180 degrees out of phase with the area ND and it therefore requires one-half revolution of the shaft to aline with the wiper W3, thus the needle is then in the needle-up position. Hereinafter, the combination of wiper W1 and area ND will be referred to as the needle-down sensor, while the combination of wiper W3 and area NU will be referred to as the needle-up sensor and rides on the uninterrupted middle portion of the commutator 132.

Means are provided to permit one or the other of the needle-up or needle-down sensors to be connected into the circuit of the control such that the driven element will be stopped in the corresponding position. This connecting means comprises a knee operated position selector switch PSS supported beneath the table 11 as best illustrated in FIG. 7. The switch is biased in a suitable manner to normally connect the wiper W1 of the needle-down sensor ND and W1 in the control circuit. Thus, the operator need only shift the switch PSS against the biasing means to its other position to similarly connect the needle-up sensor NU and W3 to the control circuit and disconnect the needle-down sensor. Operator control of the switch is effected through a knee actuated L-shaped lever 136 having a knee pad 138 at one end and an actuator arm 139 at its opposite end, with the lever being pivoted about a pin 140 supported from a bracket 141 attached to the lower surface of the table 11. If the operator wishes to stop the machine in the needle-up position, the knee pad 138 is shifted laterally with the knee, thus pivoting the lever 136 in a counterclockwise direction about the pin 140 to depress the switch actuator PSSa by movement of the actuator arm 139.

The operator will usually want to stop the machine 10 in the needle-up position for the purpose of removing the work material and, therefore, it is further necessary to shift the presser foot 20 upwardly. To accomplish this, the knee actuator lever 136 is also coupled to effect vertical movement of the presser foot 20 against the biasing effect of a spring 142 located in the hollow head 15. A lever 144 is pivotally supported by a pin 145 in the horizontal arm 14 of the sewing machine 10, with one end projecting into the head 15 and coupled through a bracket 146 to a collar 148 rigidly secured to the upper end of the presser foot 20. The opposite end of the lever 144 is connected by a tie rod 149 to a lever 150 which is pivoted at 151 to the table 11 and defines a cam surface 152. When the lever 136 is pivoted, a cam actuator 154 integral therewith causes pivotal movement of the cam lever 150.

Thus, when the operator shifts the knee pad 138 to the right as viewed in FIG. 7, the switch actuator PSSa is depressed to activate the needle-up sensor NU and W3 to signal the control to stop the needle 18 in the raised position. Further movement of the pad 138 to the right, through the linkage defined by actuator 154, cam lever 150, tie rod 149, lever 144, bracket 146 and collar 148 causes the presser foot 20 to shift upwardly against the bias of the spring 142, thus releasing and permitting removal of the material being sewed.

*(d) Clutch and brake control circuits*

For the purpose of permitting operation of the sewing machine 10 at a selectable one of a plurality of different, substantially constant speeds, a speed controller is provided. In the exemplary construction, the speed controller includes a plurality of switches S1, S2 and S3 (FIG. 9) which are selectively closed by the operator by means of an operator controlled foot treadle FT (FIGS. 1 and 9). The arrangement is such that once power has been applied to the machine 10 by closure of an ON-OFF switch S4 (FIGS. 1 and 9), the operator need only "toe" the foot treadle FT to initiate an operating cycle. Thus, when the operator "toes" or depresses the foot treadle FT slightly, the switch S1 transfers thus closing the RUN contacts of the switch S1 and permitting current flow through the series connected centrifugal switches 77 and 77' in a manner to be described below. Each time that the speed of the machine 10 exceeds the speed level for which the centrifugal switch 77 is set, the contacts of the latter open and the current path through the switches 77 and 77' and the RUN contacts of the switch S1 is broken. Thus, opening and closure of the centrifugally operated switch 77 serves to permit operation of the sewing machine at a first constant speed which is determined by the setting of the switch 77. However, when the operator wishes to run the machine at a higher substantially constant speed, it is merely necessary to further depress the foot treadle FT, thus closing the switch S2 and shorting out or bypassing the low speed centrifugal switch 77. Under these conditions, the machine 10 will operate at a second constant speed determined by opening and closure of the contacts of the high speed centrifugal switch 77'. Finally, when the operator wishes to run the machine at its maximum rated speed the foot treadle FT is fully "toed" or depressed, thus closing the switch S3 and shorting out the high speed centrifugal switch 77'. Thus, the operator may select any one of three substantially constant operating speeds by simply depressing the foot treadle FT a known amount. Those skilled in the art will appreciate from the foregoing that three or more permissible constant operating speeds could be attained simply by providing the necessary number of centrifugally operated switches each set for a different operating speed and by modifying the speed controller so that depression of the foot treadle FT successively shorts out each centrifugal switch provided.

Referring to FIG. 9, it will be observed that in order to start the machine, switch S4 is shifted from the OFF to the ON position, thus connecting the primary winding of a transformer T1 across power lines L1 and L2 coupled to a suitable AC power source (not shown). At the same time, shifting of the switch S4 on the ON condition serves to couple the motor 35 (FIGS. 2 and 9) of the power transmitter 21 directly to the AC power lines L1 and L2, thus energizing the motor 35 and rotationally driving the flywheel 54 of the clutch 33. Alternating current is supplied by the transformer T1 through a secondary winding to a full wave rectifier RE. The latter, in turn, transmits pulsating direct current to power distribution lines L3, L4 which serve to supply current to a clutch control circuit and a stop position control circuit during an operating cycle of the machine. A capacitor C1 is preferably coupled across the output terminals of the bridge rectifier RE for smoothing the direct current pulses supplied to the various control circuits.

In keeping with the present invention, provision is made for energizing the clutch coil 62 (FIGS. 2 and 9) when the operator depresses the foot treadle FT (FIGS. 1 and 9) to initiate an operating cycle for the sewing machine 10, and for simultaneously controlling energization of the clutch coil to insure that the machine is operated at a known, substantially constant speed, which speed is selected by the operator by selectively depressing the foot treadle in the manner previously described. To this end, the energizing circuit (FIG. 9) for the clutch coil 62 comprises resistors R1 and R2, a clutch control transistor TC, and a variable resistor R3. The arrangement is such that when the clutch control transistor TC is turned ON, the clutch coil 62 is energized, thus establishing a power driven connection between the power transmitter 21 (FIG. 1) and the vertically reciprocable needle bar 16 through the clutch, shaft 31, drive belt 28 and needle drive shaft 19. Alternatively, when the control transistor TC is turned OFF the clutch coil 62 is deenergized, thus breaking the driving connection between the power transmitter 21 and the needle bar 16. In the control circuit shown in FIG. 9, the clutch control transistor TC, as well as the remaining control transistors described below, are all conventional PNP type transistors of the type having an emitter $e$, base $b$, and collector $c$, wherein the transistor is normally turned OFF, and is only turned ON when the voltage level at the base $b$ is such that current flows in the emitter-base circuit.

To control the voltage level at the base $b$ of the transistor TC and, thus control energization of the clutch coil 62, a circuit including resistor R4, centrifugal switches 77 and 77', a diode D3, and switch S1 is connected between power distribution lines L3 and L4. This circuit is completed only when switch S1 is in the run position, i.e., only when the foot treadle FT is depressed or partially depressed. As the foot treadle FT is progressively depressed the switches S1, S2 and S3 are sequentially closed as previously described. Thus, when the operator "toes" the foot treadle FT, the RUN contacts of the switch S1 close, thereby permitting current flow in the circuit including resistor R4 and producing a voltage drop across the resistor R4. This lowers the voltage level at the base $b$ of the transistor TC to a level below that of the emitter $e$, thus rendering the transistor conductive and permitting current flow in the circuit including resistors R1 and R2, the emitter-collector circuit of the transistor TC, clutch coil 62, and resistor R3, thereby energizing the clutch. The clutch coil 62 will remain energized as long as the clutch control transistor remains ON or conductive—that is, until the voltage level at the base $b$ of the transistor again rises to a level which precludes current flow in the emitter-base circuit of the transistor, at which time the transistor is turned OFF and the clutch coil 62 is deenergized. Stated another way as long as current flows in the circuit including resistor R4, switches 77, 77', and switch S1, there will be a voltage drop across resistor R4 and the clutch control transistor will be turned ON.

Assuming that the operator has only depressed the foot treadle FT far enough to close the RUN contacts of switch S1, but not far enough to close switch S2, it will be understood that current will flow in the circuit including resistor R4 until such time that the machine speed exceeds the level for which the centrifugal switch 77 is set, at which time the switch 77 will open, current flow through resistor R4 terminates, the voltage level at the base $b$ of the transistor TC increases, and the transistor is turned OFF thus deenergizing the clutch coil 62. As the machine 10 starts to slow down, the switch 77 recloses and the transistor is again turned ON, thus reenergizing the clutch. As long as the operator maintains the foot treadle in this particular depressed state, the foregoing ON-OFF cycling of the transistor continues at a rapid rate to repetitively energize and deenergize the clutch coil 62, thus driving the machine 10 at a substantially constant speed determined by the setting of the centrifugal switch 77. Should the operator depress the foot treadle further and thus close switch S2, the centrifugal switch 77 will be bypassed and thereafter the transistor TC will be turned ON and OFF with closure and opening of the contacts of the high speed centrifugal switch 77'. Finally, should the operator fully depress the foot treadle FT, the switch S3 will close, thus completing the base control circuit for the transistor TC through resistor R4, and the now closed switches S1, S2 and S3 in the speed controller 162. Under these conditions, the transistor TC will remain on and the machine 10 will run at a constant maximum speed until such time that the operator either eases up on the treadle to slow the machine down—that is, releases the treadle enough to permit opening of one or both of the switches S2 and S3—or until the operator "heels" the treadle to stop the machine 10, in which event the switch S1 opens, current flow through resistor R4 terminates, the voltage level at the base $b$ of transistor TC increases, and the transistor is turned OFF, thus deenergizing the clutch coil 62. The foregoing construction is such that the centrifugal switches 77 and 77' serve only to interrupt base current of the control transistor TC and, therefore, inductive loading of the clutch coil 62 will not create arcing at, or otherwise effect, the governor contacts, thus prolonging the life of the latter. For the purpose of preventing high inductive voltages from damaging the transistors TB and TC as the circuits are deenergized, diodes D1 and D2 are connected to provide an internal circuit path and slow the decay of current in the respective coils. Resistor R5 limits the internal circuit current to speed the clutch coil current decay somewhat.

To stop the machine by engagement of the brake 64 (heretofore described in conjunction with FIG. 2), the brake coil 72 is energized through a circuit including resistors R1 and R2, a brake control transistor TB and the variable resistor R3. Current flow in this circuit is controlled by the conducting state of the emitter-collector circuit in the control transistor TB. Thus, when the transistor TB is ON, current flows in the emitter-collector circuit, and the brake coil 72 is energized. Alternatively, when the transitor TB is OFF, the brake coil is deenergized. For the purpose of selectively controlling the transistor TB, its base $b$ is connected to a circuit including resistors R6 and R7 and the STOP contacts of the treadle controlled switch S1. Thus, when the operator "heels" the treadle FT the STOP contacts of the switch S1 close and current flows in the circuit including resistors R6 and R7, thus causing a voltage drop across resistor R6 and lowering the base voltage level of transistor TB below that of the emitter $e$ thereby turning the transistor TB ON and rendering the emitter-collector circuit conductive. When this occurs, the brake coil 72 is energized, thus drawing the brake disk 65 (FIG. 2) into braking engagement with the stationary brake plate 66 and rapidly stopping the driven machine components. When the operator again "toes" the treadle FT, the STOP contacts of the switch S1 open, thus interrupting current flow through resistor R6 and increasing the voltage level at the base $b$ of the transistor TB. This turns the transistor OFF and deenergizes the brake coil 72. A diode D2 is coupled across the terminals of the brake coil for the purpose of dissipating the inductively stored energy therein when the coil is deenergized, thus assuring fast disengagement of the brake.

SPEED AND POSITIONING CONTROLS ACCORDING TO THE PRESENT INVENTION

Thus far, the environment of the invention has been described in conjunction with an exemplary power driven machine, here a sewing machine 10, which machine is provided with an electric drive motor 35 and an electromagnetic clutch and brake together with suitable controls therefore. As heretofore described, it will be observed that depression of the treadle FT to at least close the RUN contacts of switch S1 permits current flow through resistor R4, thus turning the clutch control transistor ON and energizing the clutch coil. Each time that the speed of the machine exceeds the level permitted by a selected one of the centrifugal switches 77 and 77' (the particular switch selected being dependent upon the amount of treadle is depressed), the selective switch opens, the clutch control transistor TC is turned OFF, and the clutch is deenergized. If the foot treadle FT is fully depressed, the coil 62 remains energized. Thus, the operator, by depressing the treadle FT a selected amount, effectively controls current flow in the clutch coil energizing circuit, thereby determining the speed of operation of the machine. Release of treadle FT opens the RUN contacts and closes the STOP contacts of the switch S1, thereby deenergizing the clutch coil 62 and energizing the brake coil 72 to rapidly engage the brake and stop the machine. It will, of course, be appreciated that the particular positions in which the driven machine components stop may vary over an infinite range dependent upon, for example, the speed of the machine, the load, and the instantaneous position of such components when the brake coil 72 is energized. Therefore, as thus far described, the sewing machine needle may come to rest in any random position, including the needle-up and needle-down positions or any intermediate position.

The present invention is concerned with an improved speed and positioning control system wherein the driven system components are not only driven at selectable controlled constant speeds, but also where such components can be reliably and rapidly brought to rest in a predictable stop position, or in a selected one of a plurality of predictable stop positions.

In accordance with one of the important aspects of the present invention, provision is made for detecting the position in which the driven machine components randomly stop when the brake is applied to stop the machine 10, and when the detected random stop position is other than the desired stop position, for automatically driving or indexing the driven machine components rapidly into the desired stop position at a controlled speed whereby sufficient torque is developed to insure proper operation of the machine. In the practice of the present invention, this is accomplished by detecting the random stop position of a driven system component and, when the detected position is other than the desired position, by releasing the brake and simultaneously turning the clutch conrtol transistor TC ON, thus applying full energizing voltage to the clutch coil 62 for the purpose of indexing the driven system components into the desired stop position, e.g., the needle-down position. Moreover, in carrying out this aspect of the invention, provision is made for closely regulating the drive speed during the indexing cycle so as to insure that the system components are driven at a speed which permits of rapid positioning at a torque level sufficient to support proper operation, yet at a speed which is not so great that the driven components overshoot the desired stop position.

In carrying out this aspect of the invention, provision is first made for insuring that the machine 10 slows sufficiently or comes to a complete stop whenever the speed control circuit is disabled and the brake coil 72 is energized due to "heeling" of the treadle FT and consequent opening of the RUN contacts and closure of the STOP contacts of the switch S1. To this end, the needle position sensor, or rotary switch 122 functions in the manner previously described to detect the random stop position of the shaft 19. Referring to FIG 9, it will be noted that the wiper W2 associated with the needle position sensor 122 is coupled with the STOP contacts of the switch S1 through the normally closed contacts DR1 controlled by a delay relay DR. Similarly, the wipers W1 and W3 (respectively associated with the needle-down and needle-up sensors, ND, W1 and NU, W3) are respectively coupled to the junction point 162 in the base circuit of the clutch control transistor TC through normally open contacts NR1 and normally closed contacts NR2 controlled by a needle position relay NR. The arrangement is such that an energizing circuit for the delay relay DR is completed through a current limiting resistor R10 when the RUN contacts of the switch are closed. Under these conditions, the relay DR is energized and its contacts DR1 held open during operation of the machine, thereby disabling the needle position sensor. When the operator "heels" the treadle, the RUN contacts of the switch S1 open, thus breaking the energizing circuit for the relay DR and permitting closure of the contacts DR1 so as to activate the needle position sensor switch 122. However, in order to insure that the machine 10 comes to a complete stop before activation of the switch 122, provision is made for momentarily delaying deenergization of the delay relay DR. To this end, a capacitor C2 is connected across the terminals of the relay in such a manner that the capacitor is charged when the RUN contacts of the switch S1 are closed. When the run contacts of the switch S1 open, the capacitor discharges through the relay DR, thus holding the relay in its energized state for a predetermined delay interval during which the normally closed contacts DR1 remain open while the driven elements of the machine 10 come to a complete stop in any random position. When the charge on the capacitor has been dissipated, the relay DR drops out and the contacts DR1 controlled thereby reclose to activate the needle position sensor.

In the event that the sewing machine 10 should happen to stop randomly in the selected predetermined stop position, for example, the needle-down position, such condition will be detected by the needle-down sensor ND and W1—that is, the wiper W1 will be in engagement with the barrier material ND and no circuit will be completed through the selected contacts or wipers W1 and W2 of the rotary switch 122. Under these conditions the machine remains stopped. However, under normal conditions it is more likely and indeed probable, that the driven machine elements will stop in other than the desired stop position. Under these conditions, and in the practice of the present invention, provision is made for automatically deenergizing the brake coil 72 and energizing the clutch coil 62 (even though the foot treadle FT is "heeled" and the STOP contacts of the switch S1 are closed) to rapidly index the machine 10 to the desired stop position, such, for example, as the needle-down position, at a closely regulated speed, but at a high torque level, and for deenergizing the clutch coil and reenergizing the brake coil when the driven elements are properly positioned in the desired stop position.

In keeping with the foregoing aspect of the invention, and assuming that the needle 18 randomly comes to rest in other than the desired needle-down position, it will be understood from the previous description that the wiper W1 will not be in engagement with the portion ND of barrier material, but, rather, the wiper W1 will rest on the commutator strip 132. When the contacts DR1 controlled by the delay relay DR close, a circuit is completed through resistors R8 and R9, the normally closed contacts NR2 controlled by the needle positioning relay NR, wiper W1, commutator 132, wiper W2, relay contacts DR1, and the STOP contacts of the treadle actuated switch, S1, thus producing a voltage drop across resistor R8. The resulting voltage drop across the resistor R8 lowers the voltage level at the base $b$ of a control transistor T3, thus permitting current flow through the emitter-base junction of the transistor T3 and turning the latter ON. Referring to FIG. 9, it will be observed that the emitter $e$ of the transistor T3 is coupled to the junction between resistors R1 and R2, while the collector $c$ of the transistor T3 is coupled directly to the base $b$ of the brake control transistor TB. Thus, the arrangement is such that when the transistor T3 is turned ON (i.e., when the selected sensor, here the needle-down sensor ND, W1, detects a random stop position other than the desired stop position) current flows in the emitter-collector junction of the transistor T3, thus effectively shunting the emitter-base junction of the brake control transistor TB and turning the latter OFF, thereby deenergizing the brake coil 72 and releasing the brake.

In keeping with the illustrative form of the invention, completion of the electrical circuit through the wipers W1 and W2 and the commutator 132 of the needle position sensor 122 simultaneously serves a dual function. Thus, current flow in this circuit serves not only to turn the transistor T3 ON and hence, turn transistor TB OFF (thus deenergizing the brake coil 72), but moreover, current simultaneously flows in the circuit including resistor R4, centrifugal switches 77 and 77' normally closed contacts NR1, wipers W1 and W2, commutator 132, normally closed contacts DR1, and the STOP contacts of the switch S1. Thus at the same time the transistor TB is turned OFF and the brake coil 72 is deenergized, a voltage drop is produced across resistor R4, thus dropping the voltage level at the base $b$ of the clutch control transistor and turning the latter ON so as to energize the clutch coil 62. The machine 10 now starts to run despite the fact that the foot treadle FT is still "heeled" and the STOP contacts of the switch S1 are closed. At this time, both switches S2 and S3 are open and when the low speed centrifugal switch 77 opens as the indexing speed reaches the predetermined value for which the switch is set, current flow through resistor R4 ceases. This removes the voltage drop across the resistor R4, turns the clutch control transistor TC, OFF, and deenergizes the clutch coil 62. As the speed drops, switch 77 will again close to turn transistor TC ON. In this way, the clutch is automatically energized to drive the driven element at the slower, relatively constant, speed determined by the setting of the centrifugal switch 77.

Therefore, so long as needle position switch 122 is in its first or conductive state—that is, during the period that the wiper W1 engages the commutator 132—the brake 64 is released and the clutch control transistor TC is cycled ON and OFF under the control of the centrifugal switch 77. When the needle reaches the desired position (here, the needle-down position), switch 122 changes to its second state and becomes nonconductive since the wiper W1 comes in contact with the nonconductive portion ND, thus opening the circuit and disengaging the clutch 38 by turning the transistor TC OFF. At the same time, the brake 64 is reengaged since transistor T3 is made nonconductive, thereby again turning transistor TB ON. Engagement of the brake immediately stops the driven element, including the needle, in the desired needle-down position.

In accordance with another of the important aspects of the present invention, provision is also made for selectively and automatically stopping the exemplary driven needle 18 in the needle-up position. Thus, as previously described, the needle position sensor 122 includes a third wiper W3 which cooperates with an exposed area NU of barrier material defined by a cut-out in the commutator 132 so as to form a needle-up sensor NU and W3, which needle-up sensor may be selectively activated by the operator simply by shifting the knee pad 138 laterally (to the right as viewed in FIG. 7). Referring to FIG. 9, it will be observed that actuation of the knee pad 138 serves to close the contacts of the needle position selector switch PSS, thus completing an energizing circuit for the needle relay NR through a set of normally closed contacts DR2 controlled by the delay relay DR. When the relay NR is energized, the normally closed contacts NR2 associated with the wiper W1 open, thus deactivating the needle-down sensor ND and W1. At the same time, the normally open contacts NR1 associated with the wiper W3 close, thus activating the needle-up sensor NU and W3, while normally open contacts NR3 close to hold the relay NR in through its own contacts.

Thus, it will be appreciated that when the operator "heels" the foot treadle FT, the clutch coil 62 is deenergized and the brake coil is energized. Consequently, the machine 10 comes to a rapid stop at any random position which may, but probably will not, coincide with the desired stop position. After a momentary delay, the normally closed contacts DR1, DR2 controlled by the delay relay DR reclose, thus activating the needle position sensor 122. Assuming that the operator wishes to stop in the needle-down position, the knee pad 138 is left untouched—that is, it is left in the position shown in FIGS. 7 and 9. Under these conditions, the needle relay NR is deenergized and the needle-down sensor ND, W1 is activated. If, the machine 10 randomly stops in other than the needle-down position, the brake coil 72 is automatically deenergized and the clutch coil 62 is energized in the manner previously described, thus indexing the machine under the regulated speed control provided by centrifugal switch 77 to the needle-down position where the wiper W1 engages the insulating material ND, thus deenergizing the clutch and reenergizing the brake.

Alternatively, if the operator wishes to stop in the needle-up position, it is merely necessary to "heel" the treadle FT and simultaneously shift the knee pad 138 laterally, thus closing the contacts of the position selector switch PSS. Once again the machine 10 will stop randomly and, after momentary delay, the delay relay DR drops out, thus reclosing contacts DR1 and DR2. Under these conditions, the needle relay NR is energized so as to activate the needle-up sensor NU and W3. Indexing of the machine 10 to the desired stop position is now under the control of the needle-up sensor and, when the wiper W3 engages the insulated segment NU, the machine stops in the desired needle-up position.

Occasionally the operator will want to shift the needle from a stopped needle-down position to a needle-up position. When this is desired, it is merely necessary to shift the knee pad 138 laterally, and since the contacts DR2 are then closed, the needle relay NR will be energized, thus deactivating the needle-down sensor ND and W1 and activating the needle-up sensor NU and W3. This will again serve to deenergize the brake coil 72 and energize the clutch coil 62, whereupon the machine 10 will be indexed through 180° to the desired needle-up position.

It will be appreciated from the foregoing that whenever the machine 10 is stopped in the needle-up position, it will remain in such position until the next time that the operator "toes" the treadle FT since the needle relay is held in through its own contacts NR3 and through the normally closed contacts DR2 of the delay relay. However, when the operator next "toes" the treadle FT, the RUN contacts of the switch S1 close, thus completing an energizing circuit for the delay relay DR and causing the contacts DR to open. When this occurs, the needle relay NR is deenergized and the needle-down sensor W1 and ND is again activated so that the next time the machine stops, it will stop in the down position unless the operator again shifts the knee lever 136.

In some instances, it may also be desirable to step the needle through one or more single stitch operations, and, for this purpose, a switch FS is positioned to be selectively actuated by the foot (see FIG. 1). Closure of switch FS completes a shunt circuit around the contacts NR1 and NR2 and the position sensor 122, so that current flows through both resistor R4 and resistors R8 and R9 because during those intervals when the contacts 77 are closed to turn on transistor TC essentially the full source voltage between lines L3 and L4 is applied to the clutch coil 62.

It will thus be apparent that the subject control permits operation of the machine at any one of a plurality of approximately constant speeds from a single speed power drive means, and thereafter precisely stops the driven element in any selected one of a plurality of desired positions. Furthermore, during the stop positioning operation, sufficient torque is applied to the driven element for quick positioning and proper operation, because during those intervals when the contacts 77 are closed to turn on transistor TC essentially the full source voltage between lines L3 and L4 is applied to the clutch coil 62, thus insuring that the needle (where the power driven machine takes the form of the exemplary sewing machine here described) effectively penetrates the material.

I claim as my invention:

1. For use in driving a rotatable driven member from a rotating driving member and stopping the driven member in a predetermined position, there being a clutch interposed between said driving and driven members and a brake associated with and effective upon said driven member, the combination comprising first means including a control member movable between "stop" and "run" positions for respectively (a) disengaging said clutch and engaging said brake or (b) disengaging said brake and engaging said clutch, a position sensor coupled to said driven member and having first and second states when the driven member is respectively in or out of a predetermined position, positioning means rendered effective when both (a) said control member is in its "stop" position and (b) said sensor is in its second state for disengaging said brake and engaging said clutch, said positioning means including a centrifugally-operated speed sensor coupled to said driven member and normally having a first state but having a second state whenever the speed of the driven member is greater than a predetermined value, and said positioning means including means for disengaging said clutch when said speed sensor is in its second state even though said position sensor is in its second state whereby said driven member is moved at a speed determined by said speed sensor to said predetermined position whenever said control member is returned to its "stop" position.

2. The combination set forth in claim 1 further characterized in that said first means includes means for disengaging said clutch when said speed sensor is in its second state even though said control member is in its "run" position, so that during normal "running" operation the speed of the driven member is determined by said speed sensor.

3. The combination set forth in claim 1 further characterized by a second centrifugally-operated speed sensor coupled to said driven member and normally having a first state but having a second state whenever the speed of the driven member is greater than a second predetermined value which is greater than the first-named predetermined value, and said first means includes means for disengaging said clutch when said second speed sensor is in its second state even though said control member is in its "run" position, so that during normal "running" operation the speed of the driven member is controlled by said second speed sensor as a result of on-off cycling of said clutch.

4. The combination set forth in claim 1 further characterized by means for preventing the operation of said positioning means until the driven member comes to a stop after said control member is moved to its "stop" position.

5. The combination set forth in claim 3 further characterized by selection means for causing either the first-named speed sensor or said second speed sensor to control the deenergization of said clutch when the control member is in its "run" position, so that during normal "running" operation the speed of the driven member is determined by on-off cycling of the clutch according to said first or said second predetermined value.

6. For use in driving a rotatable driven member at a controlled speed from a constant speed rotary driving member and stopping the driven member in a predetermined position, there being an electromagnetic clutch interposed between said driving and driven members and an electromagnetic brake associated with and effective upon said driven member, said clutch and brake each having a coil responsive to energization for engaging the same, the improvement which comprises in combination first means including a control member movable between "stop" and "run" positions for respectively (a) deenergizing said clutch coil and energizing said brake coil or (b) deenergizing said brake coil and energizing said clutch coil, said first means including a circuit for supplying energizing current to said clutch coil and first centrifugally operated switch means coupled to and responsive to the speed of said driven member for interrupting current through the circuit whenever the speed of the driven member exceeds a first predetermined value so that the driven member is controlled to rotate at a substantially constant first speed determined by said first predetermined value as a result of on-off cycling of the clutch, a position sensor coupled to said driven member and having first and second states when the latter is respectively in or out of a predetermined position, positioning means rendered effective when both (a) said control member is in its "stop" position, and (b) said sensor is in its second state for deenergizing said brake coil and energizing said clutch coil, said positioning means including a second centrifugally-operated switch means coupled to and responsive to the speed of said driven member for interrupting current through the clutch coil whenever the speed of the driven member exceeds a second predetermined value so that the driven member is controlled to rotate at a substantially constant second speed determined by said second predetermined value as a result of on-off cycling of the clutch so long as said position sensor is in its second state and until the driven member is located in said predetermined position.

7. The combination set forth in claim 6 further characterized in that said first and second centrifugally operated switch means are constituted by a single centrifugal switch and said first and second predetermined values are the same.

8. The combination set forth in claim 6 further characterized in that said first predetermined value is substantially greater than said second predetermined value, so that the controlled speed of said driven member during functioning of said positioning means when the control member in its "stop" position is relatively low compared to the controlled speed of the driven member when the control member is in its "run" position.

9. The combination set forth in claim 6 further characterized by means for preventing operation of said positioning means for a predetermined time interval after the instant at which said control member is moved to its "stop" position.

10. For use in driving a rotatable member at a controlled speed from a constant speed rotary driving member and stopping the member in a predetermined position, there being an electromagnetic friction clutch interposed between said driving and driven members and an electromagnetic friction brake associated with said driven member, said brake and clutch each having a coil responsive to energization thereof for engaging the same, the improvement which comprises in combination a first switch movable between "stop" and "run" positions and circuit means controlled thereby for respectively (a) deenergizing said clutch coil and energizing said brake coil and (b) deenergizing said brake coil and energizing said clutch coil, means operative when said first switch is in its "run" position for deenergizing said clutch coil whenever and so long as the speed of the driven member exceeds a predetermined value so that the clutch is cycled on and off to maintain the speed substantially at that value, a position sensor coupled to said driven member and having second switch means opened and closed when the member is respectively in or out of a predetermined position, positioning means rendered effective only when both (a) said first switch is in its "stop" position and (b) said second switch means are closed for deenergizing said brake coil and energizing said clutch coil, said positioning means including a centrifugally-operated switch means coupled to and driven by said driven member and opened or closed when the speed of the driven member respectively does or does not exceed a pre-established value, and said positioning means further including means for deenergizing said clutch coil whenever said centrifugally operated switch is open, so that upon return of the first switch to its "stop" position, the driven member is moved at a speed determined by said pre-established value and in consequence of on-off cycling of said clutch until it reaches said predetermined position.

11. The combination set forth in claim 10 further characterized by means for preventing operation of said positioning means until the driven member has stopped after said first switch means is moved into its "stop" position.

References Cited

UNITED STATES PATENTS

| | | | |
|---|---|---|---|
| 2,920,221 | 1/1960 | Schwab | 112—119 X |
| 3,160,128 | 12/1964 | Heidt | 192—18.2 X |
| 3,174,450 | 3/1965 | Becker et al. | 192—18.2 X |
| 3,229,796 | 1/1966 | Worst | 192—104 |
| 3,253,563 | 5/1966 | Myers | 112—220 X |
| 3,268,047 | 8/1966 | Grygera et al. | 192—18.2 X |

BENJAMIN W. WYCHE III, *Primary Examiner.*